United States Patent [19]

Pouchol

[11] 4,397,969
[45] Aug. 9, 1983

[54] AQUEOUS DISPERSIONS OF POLYVINYLBUTYRAL HAVING LOW CONTENT OF HYDROSOLUBLES

[75] Inventor: Jean-Marie Pouchol, Lyon, France

[73] Assignee: Rhone-Poulenc Industries, Paris, France

[21] Appl. No.: 70,648

[22] Filed: Aug. 28, 1979

Related U.S. Application Data

[62] Division of Ser. No. 897,501, Apr. 18, 1978, abandoned.

[30] Foreign Application Priority Data

Apr. 22, 1977 [FR] France .................................. 77 12162

[51] Int. Cl.³ .............................................. C08L 59/02
[52] U.S. Cl. ..................................... 523/310; 524/803
[58] Field of Search ................... 260/29.6 R, 29.6 PT; 210/321.1; 523/310; 524/803

[56] References Cited

U.S. PATENT DOCUMENTS

| | | | |
|---|---|---|---|
| 3,148,141 | 9/1964 | Schonenberger et al. | 210/22 |
| 3,234,161 | 2/1966 | Snelgrove | 260/29.6 |
| 4,082,659 | 4/1978 | Heinze et al. | 210/23 F |
| 4,128,517 | 12/1978 | Kydonieus | 260/29.6 |
| 4,271,055 | 6/1981 | Daniel et al. | 260/29.6 TA |

Primary Examiner—Joseph L. Schofer
Assistant Examiner—Bernard Lipman
Attorney, Agent, or Firm—Burns, Doane, Swecker & Mathis

[57] ABSTRACT

Aqueous dispersions of particulate polyvinylbutyral are disclosed, said dispersions comprising an amount of hydrosolubles dissolved in the aqueous phase thereof, the content in the dispersions of said dissolved hydrosolubles being less than about 2.5% by weight, based upon the weight of the polyvinylbutyral. Said dispersions are useful in the formulation of certain coating compositions, e.g., paints and varnishes.

10 Claims, 1 Drawing Figure

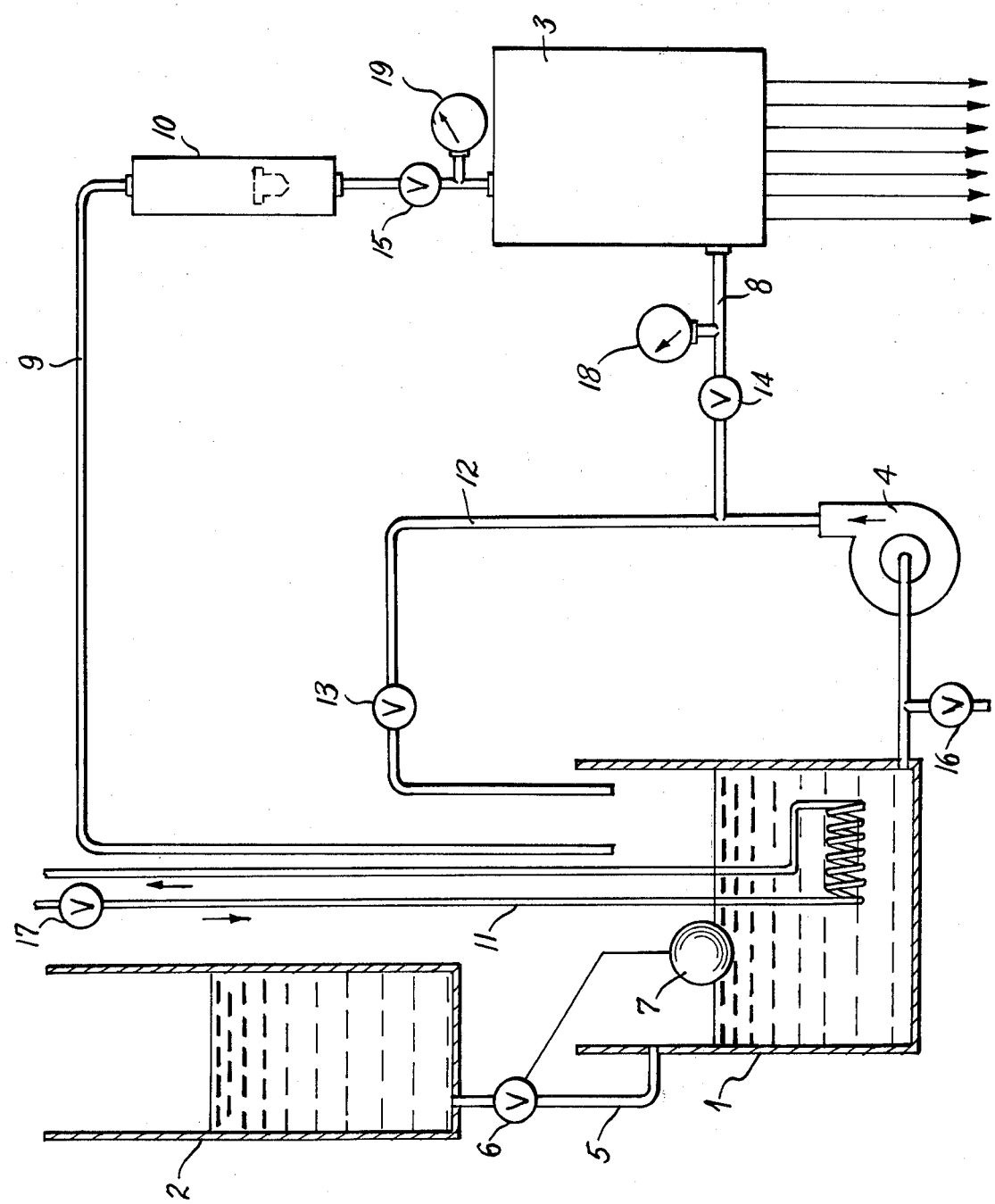

AQUEOUS DISPERSIONS OF POLYVINYLBUTYRAL HAVING LOW CONTENT OF HYDROSOLUBLES

This is a division of application Ser. No. 897,501 filed Apr. 18, 1978 now abandoned.

BACKGROUND OF THE INVENTION

1. Field of the Invention

The present invention relates to a binder, based upon an aqueous dispersion of polyvinylbutyral, for paint and varnishes.

2. Description of the Prior Art

Polyvinylacetals have valuable properties when used as coatings; however, it has hitherto been necessary to employ same in solution in organic solvents.

Various processes are known to the art which make it possible to obtain aqueous dispersions of polyvinylacetals. However, these dispersions exhibited a certain number of disadvantages, such as an inadequate solids content on the order of 15% and the presence of excessive amounts of hydrosoluble product as the emulsifier or protective colloid. These disadvantages prevented or very severely limited the use of these dispersions as varnishes or paints, especially those used as a primary coating or anti-corrosion coating on metal.

SUMMARY OF THE INVENTION

Binders, based upon an aqueous dispersion of polyvinylbutyral, have now been found for varnishes and paints intended, particularly, for coating ferrous metals, which binders are characterized in that the content in the dispersion of hydrosoluble compounds dissolved in the aqueous phase is less than 2.5% by weight, relative to the polymer.

The hydrosoluble compounds essentially consist of salts comprising catalyst residues, surface-active agents such as emulsifiers, protective colloids and low molecular weight macromolecular compounds.

Indeed, it has now surprisingly been found that, all other things being equal, a sufficiently low content in the dispersion of hydrosoluble compounds dissolved in the aqueous phase gives rise to coatings having markedly improved qualities.

BRIEF DESCRIPTION OF THE DRAWING

The FIGURE of drawing is a vertical cross-section of certain apparatus useful in formulating the dispersions according to the invention.

DETAILED DESCRIPTION OF THE INVENTION

A butyral having a content of polyvinyl alcohol groups which is typically between 10 and 30%, and more generally between 12 and 25%, is preferred as the polyvinylbutyral which can be used in the form of a dispersion according to the invention. The content of polyvinyl acetate groups is between 1 and 3%. The size of the polyvinylbutyral particles is very fine; it varies from 0.01μ to 5μ for particle aggregates. The mean size is between 0.05 and 0.1μ. The dispersions which are usually obtained by a conventional process have a solids content on the order of 10 to 20% by weight. In addition to the residual polyvinyl alcohol, they contain residues of acid condensation catalyst, aldehyde, which is generally butanal, and surface-active agents.

The dispersions obtained using phosphoric acid as the acid catalyst and a mixture of butanal and glyoxylic acid as the acetalizing agent are especially suitable for use, after treatment, as a binder, according to the invention, for varnishes or paints.

Conventional commercially available anionic materials, such as alkali metal salts of long chain fatty acids which may or may not be saturated and alkali metal alkylarylsulfonates or alkylsulfates, are generally used as the surface-active agent. Large amounts of surface-active agent, which are usually from 4 to 6% by weight, relative to the final polymer, are employed.

The content in the dispersion of hydrosoluble compounds dissolved in the aqueous phase is evaluated using the method described below, which makes use of the properties of semipermeable membranes having a high cut-off threshold, which allows the low molecular weight compounds and, if necessary, the carboxylated macromolecular compounds to therethrough, and which retains the polymer particles:

The dispersion to be examined, which has a known solids content by weight $t_d$, expressed as a percentage, is subjected to an ultrafiltration operation by passing it through a laboratory ultrafiltration unit which is equipped with a semi-permeable membrane marketed by the assignee hereof, Rhone-Poulenc Industries, under the name "Iris 3538". The solids content by weight $t_p$, expressed as a percentage, is determined for the first drop of permeate collected and is equal to that of the aqueous phase of the dispersion.

The content in the dispersion of hydrosoluble compounds dissolved in the aqueous phase $t_s$, expressed as a percentage by weight relative to the polymer, is given by the formula $$t_s = \frac{t_p(100 - t_d)}{t_d}$$

A dispersion which can be used as a binder according to the invention is generally obtained from an aqueous dispersion of polyvinylbutyral, obtained by any process which is in itself known, by removing a sufficient amount of the said hydrosoluble compounds from the latter. They can be removed, for example, by ultrafiltration through a semi-permeable membrane. During the ultrafiltration, the compounds dissolved in the aqueous phase pass through the membrane into the permeate, while the hydrosoluble compounds adsorbed on the surface of the particles of the dispersion are gradually desorbed and removed. The ultrafiltration operation can be carried out on a conventional industrial installation.

Such an installation is illustrated in the single FIGURE of drawing which is in vertical cross-section. It essentially comprises a tank 1 containing the dispersion to be treated, a tank 2 containing deionized water, an ultrafilter 3 and a pump 4. The tank 2, which charges the tank 1, feeds the latter with deionized water through the pipe 5, and the automatic valve 6, which is actuated by means of the float 7, keeps the bath contained in the tank 1 at a constant level. The pump 4 causes the dispersion to flow through the pipe 8 to the ultrafilter 3. The concentrate delivered by the ultrafilter 3 is recycled into the tank 1 through the pipe 9 on which the flowmeter 10 is assembled. A coil 11, in which heat exchange fluid circulates and which is immersed in the dispersion contained in the bath 1, makes it possible to maintain the dispersion at a constant temperature. The pipe 12 is used for starting up the installation.

The installation also comprises the shut-off valves 13, 14, 15, 16 and 17 and the manometers 18 and 19.

The starting up of the installation and the operation of the process are carried out as follows: with the valve 14 closed and the valve 13 open, the pump 4 is started and the valves 14 and 15 are then opened and the valve 13 is closed. The opening of the valves 14 and 15 is adjusted by successive approximations in order to obtain the desired dispersion flow-rate under the desired pressure, the difference in the pressures indicated by the manometers 18 and 19 representing the pressure loss in the ultrafilter 3.

In order to carry out the ultrafiltration technique successfully, it is advantageous, according to the invention, to comply with the following conditions:

(i) The semi-permeable membrane must have a high cut-off threshold, which is generally between 5,000 and 100,000, expressed as the value of the molecular weight of standard proteins in a neutral buffered medium;

(ii) The rate at which the dispersion passes through the membrane must be greater than 0.5 m/second, and preferably between 1 and 2 m/second, in order to avoid clogging the latter, while limiting the pressure loss in the ultrafilter and limiting the shear to which the dispersion is subjected;

(iii) The difference in the pressures prevailing on each side of the membrane must be between 0.1 and 6 bars, and preferably between 1.5 and 3 bars;

(iv) The temperature of the dispersion must be between 0° and 100° C., and preferably between 0° and 50° C.;

(v) As the flow-rate of the permeate decreases when the solids content by weight in the dispersion increases, it is preferable to carry out the ultrafiltration at an essentially constant content by weight, which is generally between 5 and 70%, optionally after dilution, in particular in the case where the viscosity of the dispersion is very high; and (vi) The stopping of the installation must be followed by a cycle of rinsing with pure water, the rinsing being sufficient to avoid the irreversible clogging, and therefore the destruction, of the membrane.

At the termination of the ultrafiltration procedure, the dispersion can be concentrated, if necessary, to a solids content which is suitable for the intended use.

The dispersions according to the invention exhibit numerous advantages in addition to their solids content which can be between 30 and 50%. The dispersions can be processed into, inter alia, homogeneous coatings which are strong, watertight and steamtight and they can thus be used as the primary layer or coating on metal.

In order to further illustrate the present invention and the advantages thereof, the following specific examples are given, it being understood that same are intended only as illustrative and in nowise limitative.

EXAMPLE 1

1. Production of the dispersion 4,500 cm$^3$ of a 10% strength aqueous solution of a polyvinyl alcohol possessing the following characteristics: viscosity of a 4% strength aqueous solution (20° C.): 4 mP, and ester number: 20, and 43.70 g of an emulsifier of anionic character of the sodium lauryl-sulfate type, namely, 6% of the final polymer, were introduced into a 6,000 cm$^3$ reactor equipped with an anchor-type stirrer rotating at 300 rpm.

336 cm$^3$ of butyraldehyde, containing 94.5% of aldehyde, were added over the course of a few minutes, under stirring; after homogenization, the pH of the mixture was 5.6.

20 cm$^3$ of 75% strength phosphoric acid were added. The mixture was then at a pH of 1.2.

With the water bath kept at 20° C., the temperature of the mixture fluctuated for 1 hour between 20° and 23° C. without heat being supplied, as the reaction was exothermic. A change in the appearance of the mixture was observed during this first hour and more precisely between 15 and 30 minutes after the start of the reaction. This change manifested itself in an increase in the viscosity followed by a decrease in the viscosity. It is in this period of time that the dispersion was formed and that the particles assumed their ultimate sizes.

The butyralization was terminated by heating the emulsion obtained at 30° C. for 2 hours. It was cooled to 25° C.

The dispersion obtained had the following characteristics:

| | |
|---|---|
| pH | 1.5 |
| Residual butanal content | 0.2% |
| | (remains stable with time) |
| Solids content | 15% |
| BROOKFIELD viscosity at 23° C. and at 50 rpm | 15 mP |
| Particle size | 0.1 to 1μ |

The polymer itself possessed the characteristics listed below:

| | |
|---|---|
| Viscosity in mP of the polymer solution in 95° strength ethyl alcohol at 20° C. | 10 |
| % by weight of polyvinyl alcohol groups | 18.5 |

2. Concentration of dispersion by ultrafiltration

An ultrafiltration unit was used which developed an ultrafiltration surface area of 0.7 m$^2$ and was equipped with a membrane having a cut-off threshold of 20,000, which membrane was marketed by Rhone-Poulenc under the name "Iris 3538" and which was fed by a pump adapted to produce a flow-rate of 6 m$^3$/hour under a pressure of 3 bars. During the first part of the ultrafiltration, the solids content of the dispersion was kept constant by means of deionized water. The concentration phase was then carried out. The temperature of the dispersion was kept constant at 25° C.

After 17 hours of ultrafiltration, an emulsion having the following characteristics was obtained:

| | | |
|---|---|---|
| Solids content | | 35% |
| BROOKFIELD viscosity at | 2.5 rpm | 320 mP |
| | 50 rpm | 290 mP |
| pH | | 1.5 |

This ultrafiltered emulsion exhibited the advantage over the initial emulsion of having a solids content and a viscosity which were suitable for proper industrial use.

The content of hydrosoluble compounds, in % relative to the polymer, which was greater than 8% before ultrafiltration, dropped to about 2.4% for the ultrafiltered dispersion.

The dispersion was deposited on 9×12 cm steel sheets by centrifugation. A deposit a few microns in thickness was formed and was dried at 140° C. for 3 minutes. 4 successive layers were deposited and a final dry coating of about 25μ was obtained, which was extremely adherent in the comb-scratching test (Standard Specification NF T 30,038) and had good flexibility in the ERICHSEN deep-drawing test (Standard Specification NF T 30,019). This coating resists the salt spray test (Standard Specification NF X 41,002) for more than 300 hours without the appearance of rust.

EXAMPLE 2

The procedure of Example 1 was followed, but the composition of the dispersion was slightly modified:
10 cm³ of phosphoric acid instead of 20;
302.5 cm³ of butyraldehyde instead of 336 cm³, and addition of 27.2 cm³ of glyoxylic acid.

The dispersion had the same physical characteristics as that obtained in Example 1, but the film-forming temperature was 45° C.

The dispersion was deposited on a steel sheet by centrifugation. A coating of about 25μ, deposited in 4 layers, was tested and displayed a very good adhesion in the comb-scratching test and good flexibility in the ERICHSEN deep-drawing test.

This coating resists the salt spray test for more than 500 hours without the appearance of rust, and it was observed that the excellent adhesion to the support was retained after the salt spray test.

EXAMPLE 3

A paint was prepared: 100 g of powdered titanium oxide were dispersed in 56.5 g of a 2% strength aqueous solution of an alkali metal polyacrylate sold under the name Orotan 850, by means of a turbine rotating at 1,000 rpm. 380 g of a butyral emulsion, which was prepared as in Example 1 and which had a solids content of 35%, were added, while stirring slowly (500 rpm). After being left for 24 hours, this paint was applied by centrifugation to steel sheets, so as to obtain a 30μ coating in a single layer. The paint was dried at 140° C. for 5 minutes.

This paint had an excellent adhesion in the scratching test, as well as very good flexibility in the deep-drawing test. It was capable of use as the primary layer for finishing layers which were formulated with other binders, such as, for example, glycerol/phthalic acid resins or vinyl acetate/vinyl chloride/maleic anhydride resins.

The complex system displayed a very good resistance to the salt spray test after more than 300 hours. No rust was found.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for preparing an aqueous dispersion of polyvinylbutyral having a particle size of from about 0.01μ to 5μ and containing, dissolved therein, less than about 2.5% by weight of hydrosoluble compounds relative to the weight of polyvinylbutyral, comprising the steps of
    (a) bringing an aqueous dispersion of the polyvinylbutyral, formed by reacting polyvinyl alcohol with butyraldehyde in an aqueous medium, in an aqueous solution containing, dissolved therein, an amount of no more than 2.5% by weight of hydrosoluble compounds relative to the weight of polyvinylbutyral, into contact with a semipermeable ultrafiltration membrane in such a manner that a portion of the aqueous dispersion comprising the polyvinylbutyral particles is retained and a sufficient portion of the aqueous solution is filtrated through the membrane in order to remove such an amount of hydrosoluble compounds that the amount of hydrosoluble compounds within the retained portion of the dispersion is reduced to less than about 2.5% by weight relative to the weight of the polyvinylbutyral and
    (b) in the course of the ultrafiltration, adding to the retained portion of the dispersion a sufficient amount of deionized water in order to replace at least a major part of the filtrated off portion of the aqueous solution.

2. The process as defined in claim 1, wherein the aqueous solution is continuously filtrated through the semipermeable ultrafiltration membrane and deionized water is simultaneously added to the retained portion of the dispersion.

3. The process as defined in claim 1, wherein the semipermeable membrane has a high cut-off threshold, which is generally between 5,000 and 100,000, expressed as the value of the molecular weight of standard proteins in a neutral buffered medium.

4. The process as defined in claim 1, wherein the aqueous solution passes through the semipermeable ultrafiltration membrane at a rate of more than 0.5 m/second.

5. The process as defined in claim 4, wherein the rate is between 1 and 2 m/second.

6. The process as defined in claim 1, wherein the difference in pressure of between 0.1 and 6 bars exists between the pressure prevailing on each side of the membrane.

7. The process as defined in claim 6, wherein the difference in pressure is between 1.5 and 3 bars.

8. The process as defined in claim 1, wherein the temperature of the dispersion is between 0° and 100° C.

9. The process as defined in claim 8, wherein the temperature is between 0° and 50° C.

10. In a composition of matter comprising an aqueous dispersion of particles of polyvinylbutyral and an amount of hydrosolubles dissolved in the aqueous phase thereof, the improvement which comprises the amount of such dissolved hydrosolubles in the dispersion being less than about 2.5% by weight, based upon the weight of the polyvinylbutyral and the polyvinylbutyral particles having a particle size of between 0.01μ and 5μ, and the dispersion being obtained by the process as defined in claim 1.

* * * * *